United States Patent
Bae

(10) Patent No.: US 9,310,932 B2
(45) Date of Patent: Apr. 12, 2016

(54) ELECTRONIC DEVICE, WIRELESS POWER RECEIVING APPARATUS, AND DISPLAY APPARATUS

(75) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 99 days.

(21) Appl. No.: 14/125,015

(22) PCT Filed: Jun. 7, 2012

(86) PCT No.: PCT/KR2012/004493
§ 371 (c)(1),
(2), (4) Date: Dec. 9, 2013

(87) PCT Pub. No.: WO2012/169797
PCT Pub. Date: Dec. 13, 2012

(65) Prior Publication Data
US 2014/0111475 A1    Apr. 24, 2014

(30) Foreign Application Priority Data

Jun. 8, 2011 (KR) .......... 10-2011-0055292
Jun. 8, 2011 (KR) .......... 10-2011-0055293

(51) Int. Cl.
*G06F 3/041* (2006.01)
*G06F 3/045* (2006.01)
*H04B 5/00* (2006.01)
(Continued)

(52) U.S. Cl.
CPC .............. *G06F 3/0418* (2013.01); *G06F 3/041* (2013.01); *G06F 3/045* (2013.01); *H02J 7/025* (2013.01); *H02J 17/00* (2013.01); *H04B 5/0037* (2013.01); *H04B 5/0093* (2013.01); *G06F 1/26* (2013.01); *G06F 3/044* (2013.01)

(58) Field of Classification Search
CPC ....... G06F 3/041; G06F 3/0418; G06F 3/044; G06F 3/045; H02J 17/00; H02J 7/025; H04B 5/0037; H04B 5/0093
USPC .......................................... 345/173
See application file for complete search history.

(56) References Cited

U.S. PATENT DOCUMENTS

2004/0130442 A1 * 7/2004 Breed et al. .......... 340/443
2006/0071911 A1   4/2006 Sullivan
(Continued)

FOREIGN PATENT DOCUMENTS

JP    2004-252562 A    9/2004
JP    2008-090623 A    4/2008
(Continued)

OTHER PUBLICATIONS

Office Action dated Jan. 27, 2014 in Korean Application No. 10-1997-0031829.
(Continued)

*Primary Examiner* — Viet Pham
(74) *Attorney, Agent, or Firm* — Saliwanchik, Lloyd & Eisenschenk

(57) ABSTRACT

Disclosed are an electronic device, a wireless power reception apparatus, and a display device. The electronic device, which is equipped with a wireless power receiving apparatus to wirelessly receive power from a wireless power transmission apparatus, includes a signal receiving part to receive a signal required to operate the electronic device, and a wireless power signal removing part to remove a signal having a frequency used for wireless power transmission among signals received in the signal receiving part.

20 Claims, 6 Drawing Sheets

(51) Int. Cl.
*H02J 7/02* (2006.01)
*H02J 17/00* (2006.01)
*G06F 3/044* (2006.01)
*G06F 1/26* (2006.01)

(56) References Cited

U.S. PATENT DOCUMENTS

| | | | |
|---|---|---|---|
| 2010/0085325 | A1 | 4/2010 | King-Smith et al. |
| 2010/0201314 | A1* | 8/2010 | Toncich et al. ............... 320/108 |
| 2010/0225271 | A1 | 9/2010 | Oyobe et al. |
| 2010/0245308 | A1 | 9/2010 | Takei |
| 2010/0308939 | A1* | 12/2010 | Kurs ......................... 333/219.2 |
| 2011/0009057 | A1* | 1/2011 | Saunamaki ................. 455/41.1 |
| 2011/0057891 | A1* | 3/2011 | Ham et al. .................... 345/173 |
| 2011/0115430 | A1 | 5/2011 | Saunamäki |
| 2011/0136550 | A1* | 6/2011 | Maugars ....................... 455/573 |
| 2011/0148813 | A1 | 6/2011 | Araki |

FOREIGN PATENT DOCUMENTS

| | | |
|---|---|---|
| JP | 2009106136 A | 5/2009 |
| KR | 10-1997-0031829 | 6/1997 |
| KR | 20-0364451 Y1 | 10/2004 |
| KR | 10-20070072906 A | 7/2007 |
| KR | 10-2009-0034234 A | 4/2009 |
| KR | 10-2009-0115407 A | 11/2009 |
| KR | 10-2010-0038067 A | 4/2010 |
| WO | WO-2010-064351 | 6/2010 |

OTHER PUBLICATIONS

International Search Report in International Application No. PCT IKR2012/004493, filed Jun. 7, 2012.

Office Action dated Jan. 16, 2013 in Korean Application No. Korean Application No. 10-2011-0055292, filed Jun. 8, 2011.

Office Action dated Jul. 22, 2013 in Korean Application No. 10-2011-0055293, filed Jun. 8, 2011.

Notice of Allowance dated Jun. 17, 2013 in Korean Application No. 10-2011-0055292, filed Jun. 8, 2011.

European Search Report dated May 19, 2015 in European Application No. 12796157.1.

Office Action dated Apr. 22, 2015 in Chinese Application No. 201280028253.9.

* cited by examiner

Fig. 10
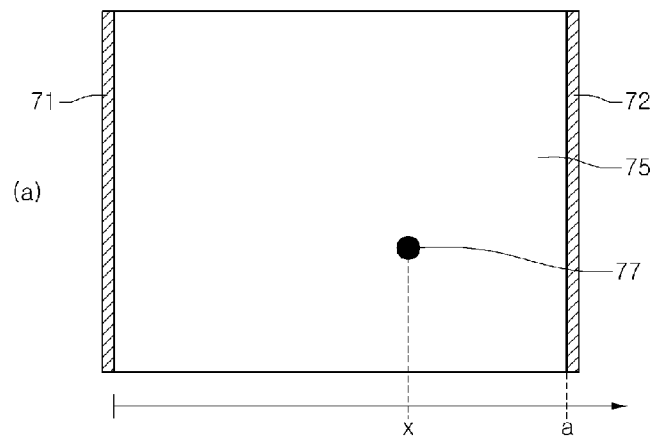
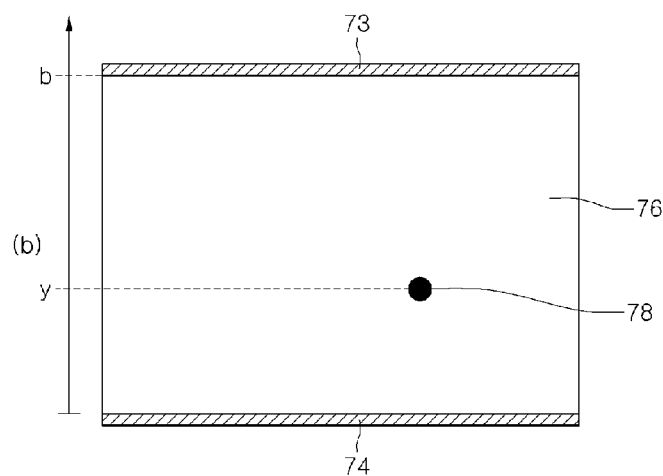
Fig. 11
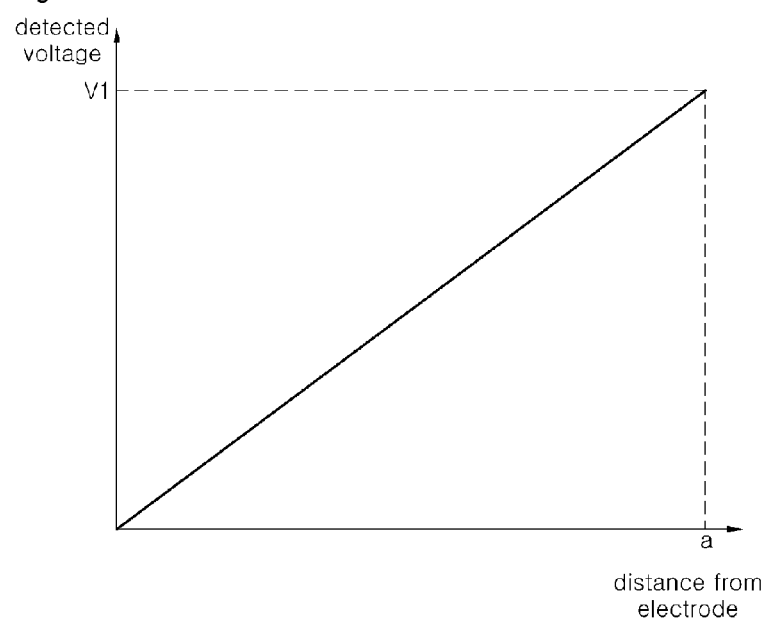

Fig. 12
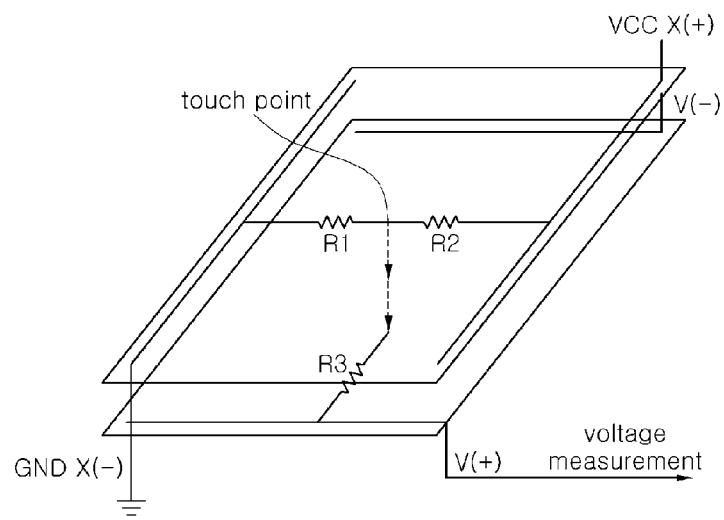
Fig. 13
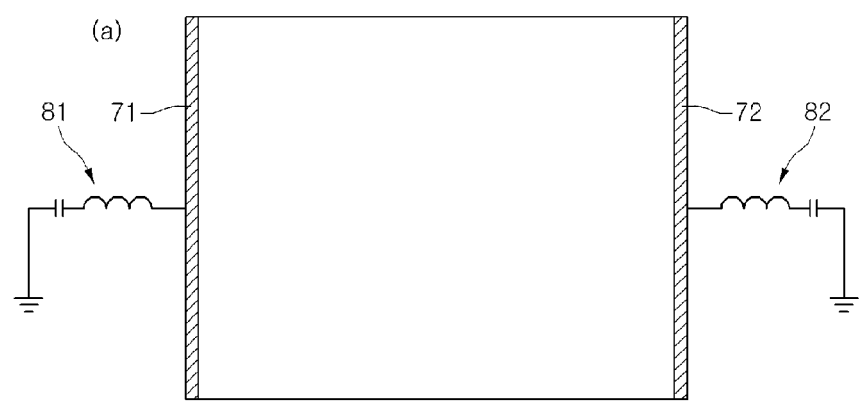
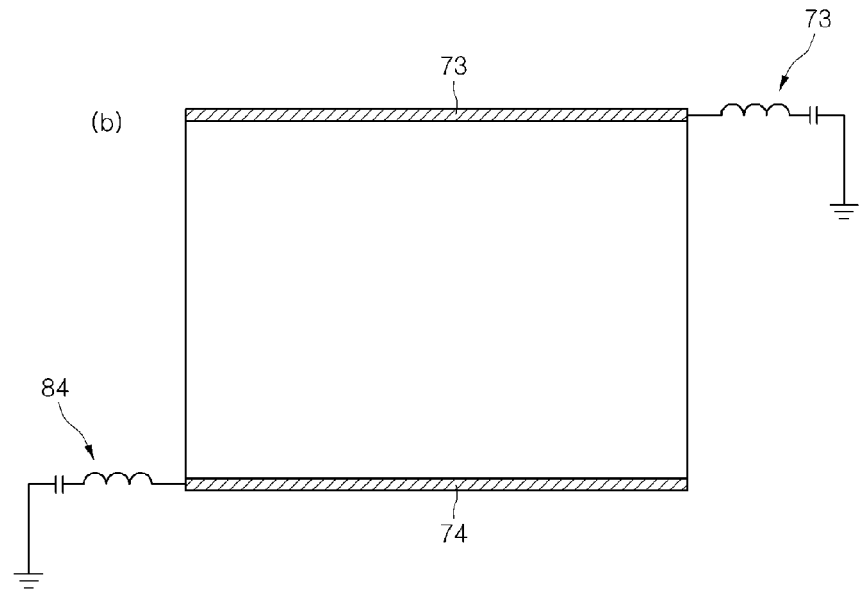

ELECTRONIC DEVICE, WIRELESS POWER RECEIVING APPARATUS, AND DISPLAY APPARATUS

CROSS-REFERENCE TO RELATED APPLICATIONS

This application is the U.S. national stage application of International Patent Application No. PCT/KR2012/004493, filed Jun. 7, 2012, which claims priority to Korean Application Nos. 10-2011-0055292, filed Jun. 8, 2011, and 10-2011-0055293, filed Jun. 8, 2011, the disclosures of each of which are incorporated herein by reference in their entirety.

TECHNICAL FIELD

The disclosure relates to a wireless power transmission technology for a mobile appliance equipped with a touch panel or a touch screen. In more particular, the disclosure relates to a method capable of preventing a touch panel or a touch screen from being erroneously operated by mounting a filter in order to prevent a signal having a frequency band of a signal for wireless power transmission from being transferred to the touch panel or the touch screen, when the terminal equipped with the touch panel or the touch screen is wirelessly charged with power.

BACKGROUND ART

A wireless power transmission or a wireless energy transfer refers to a technology for wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

Among the above wireless power transmission technologies, a wireless power transmission technology based on magnetic resonance has been recently spotlighted. The wireless power transmission technology based on the magnetic resonance is a technology of inducing an electromagnetic field to transmit power between a receiver and a transmitter that are set in a resonance state, which is suitable for long-distance power transmission.

Meanwhile, there is a scheme under the discussion as a main application field of the wireless power transmission based on the magnetic resonance. According to the scheme, a transmitter is mounted on the ceiling or the wall of a building, and a receiver is installed in a mobile appliance such as a cellular phone, so that a user can charge the mobile appliance without separately connecting a power cable only if the user stays in the interior having a wireless power transmitter installed therein.

However, recently, most of mobile appliances are equipped with touch panels or touch screens. When the mobile appliances for touch detection are charged in wireless, interference between a signal used for wireless power transmission and a signal used for touch detection occurs, so that an erroneous operation may occur in the touch detection.

DISCLOSURE OF INVENTION

Technical Problem

The disclosure is made to overcome the above problem, and an object of the disclosure is to provide a touch panel capable of preventing an erroneous operation which may occur in touch detection when a terminal equipped with a touch screen is wirelessly charged.

Solution to Problem

According to one embodiment of the disclosure, there is provided an electronic device equipped with a wireless power receiving apparatus to wirelessly receive power. The electronic device includes a signal receiving part to receive a signal required to operate the electronic device, and a wireless power signal removing part to remove a signal having a frequency used for wireless power transmission among signals received in the signal receiving part.

The wireless power receiving apparatus includes a touch receiving part to receive a touch from an input unit, and a filter to remove the signal having the frequency used for the wireless power transmission among signals output from the touch receiving part.

The touch receiving part includes a signal generator to generate a detection signal having a frequency used for touch detection, an electrode array to receive the detection signal and output the detection signal by modifying the detection signal according to approach of the input unit, a signal detector to detect signals without the signal having the frequency used for the wireless power transmission, and a controller to perform an operation corresponding to the signal detected by the signal detector.

The electrode array includes a first electrode array arranged in a first direction to receive the detection signal and a second electrode array arranged in a second direction to output the modified detection signal, and the touch panel further includes a first switching part to sequentially apply the detection signal generated from the signal generator to the first electrode array.

The touch panel further includes a second switching part to receive the detection signal output from the second electrode array and to transfer the detection signal to the filter.

The touch receiving part includes a resistive film having two terminals equipped with electrodes, and the filter includes an LC circuit connected to the electrodes and shorted at the frequency used for the wireless power transmission to remove a voltage induced into the resistive film.

The resistive film includes a first resistive film having two terminals equipped with first electrodes, and a second resistive film having two terminals equipped with second electrodes perpendicular to the first electrodes.

The LC circuit includes first LC circuits connected to the first electrodes, and second LC circuits connected to the second electrode.

At least one of the first and second resistive films includes a transparent electrode including at least one of ITO, IZO, ZnO, and AZO, and a protective film to protect the resistive film. The first and second resistive films are spaced apart from each other by a plurality of dot spacers.

According to another embodiment of the disclosure, there is provided a wireless power receiving apparatus to wirelessly receive power from a wireless power transmission apparatus. The wireless power receiving apparatus includes a receiving coil part embedded in an electronic device to wirelessly receive power from the wireless power transmission apparatus, and a signal detection part to operate by the received power and to detect a second signal obtained by removing a signal having a preset frequency from a first signal.

The preset frequency is a frequency used for wireless power transmission.

The signal detection part includes a filter to pass a signal having a first frequency and remove a signal having a second frequency, and the filter comprises at least one of a band pass filter, a band reject filter, a low pass filter, and a high pass filter.

The receiving coil part receives power from the wireless power transmission apparatus due to electromagnetic induction.

The receiving coil part includes a receiving resonance coil resonance-coupled with a transmission resonance coil of the wireless power transmission apparatus to receive power, and a receiving induction coil inductive-coupled with the receiving resonance coil to receive the power.

According to still another embodiment of the disclosure, there is provided a display device including a display panel to display an image, and a touch panel disposed on a front surface of the display panel and allowing selection of at least one function displayed on the display panel through a touch manipulation operation. The touch panel includes a touch receiving part to receive a touch through an input unit, and a filter to remove a signal having a first frequency used for wireless power transmission among signals output from the touch receiving part.

Advantageous Effects of Invention

According to the disclosure, an erroneous operation which may occur in touch detection can be prevented when a terminal equipped with a touch screen is wirelessly charged.

BRIEF DESCRIPTION OF DRAWINGS

FIGS. 10(a) and 10(b) are plan views showing upper and lower plates constituting the resistive touch screen panel;

FIG. 11 is a graph showing voltage output distribution when a touch is not made on a resistive film in the resistive touch screen panel; and FIG. 12 is a view showing a resistive-type touch detection scheme; and FIGS. 13(a) and 13(b) are views showing a resistive touch screen panel according to one embodiment of the disclosure.

BEST MODE FOR CARRYING OUT THE INVENTION

Hereinafter, exemplary embodiments of the disclosure will be described in detail so that those skilled in the art to which the invention pertains can easily realize the disclosure.

Figure 1:
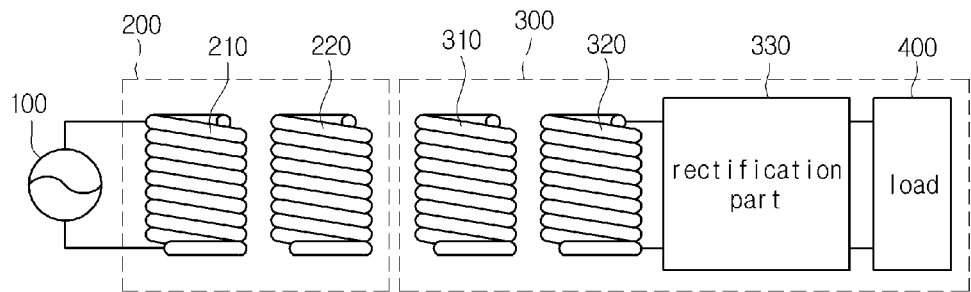
FIG. 1 is a view showing a wireless power transmission system according to one embodiment of the disclosure.

FIG. 1 is a view showing a wireless power transmission system according to one embodiment of the disclosure.

Referring to FIG. 1, the wireless power transmission system may include a power supply apparatus 100, a wireless power transmission apparatus 200, a wireless power receiving apparatus 300, and a load 400.

According to one embodiment, the power supply apparatus 100 may be included in the wireless power transmission apparatus 200.

The wireless power transmission apparatus 200 may include a transmission induction coil 210 and a transmission resonance coil 220.

The wireless power receiving apparatus 300 may include a receiving resonance coil, a receiving induction coil 320, a rectification part 330, and the load 400.

Both terminals of the power supply apparatus 100 are connected to both terminals of the transmission induction coil 210.

The transmission resonance coil 220 may be spaced apart from the transmission induction coil 210 by a predetermined distance.

The receiving resonance coil 310 may be spaced apart from the receiving induction coil 320 by a predetermined distance.

Both terminals of the receiving induction coil 320 are connected to both terminals of a rectification part 330, and the load 400 is connected to both terminals of the rectification part 330. According to one embodiment, the load 400 may be included the wireless power receiving apparatus 300.

The power generated from the power supply apparatus 100 is transferred to the wireless power transmission apparatus 200. The power received in the wireless power transmission apparatus 200 is transferred to the wireless power receiving apparatus 300 that makes resonance with the wireless power transmission apparatus 200 due to a resonance phenomenon, that is, has the same resonance frequency as that of the wireless power transmission apparatus 200.

Hereinafter, the power transmission process will be described in more detail.

The power supply apparatus 100 generates AC power having a predetermined frequency and transfers the AC power to the wireless power transmission apparatus 200.

The transmission induction coil 210 and the transmission resonance coil 220 are inductive coupled with each other. In other words, if AC current flows through the transmission induction coil 210 due to power received from the power supply apparatus 100, the AC current is inducted to the transmission resonance coil 220 physically spaced apart from the transmission induction coil 210 due to the electromagnetic induction.

Thereafter, the power received in the transmission resonance coil 220 is transferred to the wireless power receiving apparatus 300 that makes a resonance circuit with the wireless power transmission apparatus 200 due to resonance.

Power can be transmitted between two LC circuits, which are impedance-matched with each other, due to resonance. The power transmitted due to the resonance can be father transferred with higher efficiency when comparing with the power transmitted by the electromagnetic induction.

The receiving resonance coil 310 receives power from the transmission resonance coil 220 due to the resonance. AC current flows through the receiving resonance coil 310 by the received power. The power received in the receiving resonance coil 310 is transferred to the receiving induction coil 320, which is inductive-coupled with the receiving resonance coil 310 due to the electromagnetic induction. The power received in the receiving induction coil 320 is rectified by the rectification part 330 and transferred to the load 400.

The transmission resonance coil 220 of the wireless power transmission apparatus 200 may transmit power to the receiving resonance coil 310 of the wireless power receiving apparatus 300 through a magnetic field.

In detail, the transmission resonance coil 220 and the receiving resonance coil 310 are resonance-coupled with each other so that the transmission resonance coil 220 and the receiving resonance coil 310 operate at a resonance frequency.

The resonance-coupling between the transmission resonance coil 220 and the receiving resonance coil 310 can significantly improve the power transmission efficiency between the wireless power transmission apparatus 200 and the wireless power receiving apparatus 300.

A quality factor and a coupling coefficient are important in the wireless power transmission.

The quality factor may refer to an index of energy that may be stored in the vicinity of a wireless power transmission apparatus or a wireless power receiving apparatus.

The quality factor may be varied according to the operating frequency w, a coil shape, a dimension, and a material. The quality factor may be expressed in equation, $Q=w*L/R$. In Equation, L refers to the inductance of a coil, and R refers to resistance corresponding to the quantity of power loss caused in the coil.

The quality factor may have a value of 0 to infinity.

The coupling coefficient represents the degree of inductive coupling between a transmission coil and a receiving coil, and has a value of 0 to 1.

The coupling coefficient may be varied according to the relative position and the distance between the transmission coil and the receiving coil.

Figure 2:
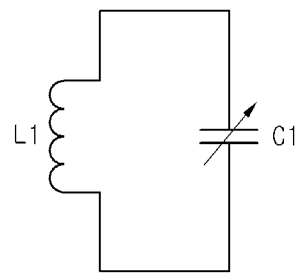
FIG. 2 is a circuit diagram showing an equivalent circuit of a transmission induction coil according to the one embodiment of the disclosure.

FIG. 2 is a circuit diagram showing an equivalent circuit of the transmission induction coil 210 according to the one embodiment of the disclosure.

As shown in FIG. 2, the transmission induction coil 210 may include an inductor L1 and a capacitor C1, and a circuit having desirable inductance and desirable capacitance can be constructed due to the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may include a variable capacitor, and impedance matching may be performed by adjusting the variable capacitor. The equivalent circuit of the transmission resonance coil 220, the receiving resonance coil 310, or the receiving induction coil 320 may be the same as that shown in FIG. 2.

Figure 3:
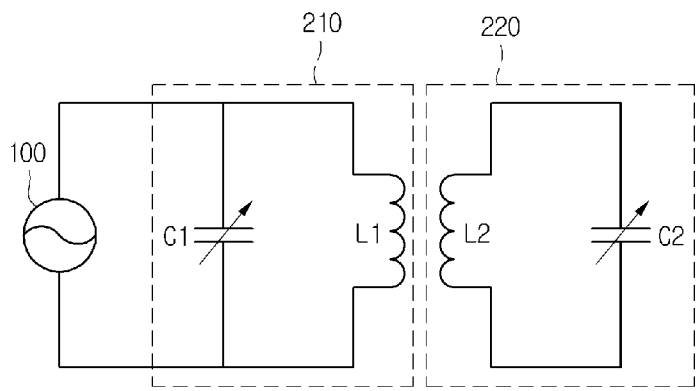
FIG. 3 is a circuit diagram showing an equivalent circuit of a power supply apparatus and the wireless power transmission apparatus according to one embodiment of the disclosure.

FIG. 3 is a circuit diagram showing an equivalent circuit of the power supply apparatus 100 and the wireless power transmission apparatus 200 according to one embodiment of the disclosure.

As shown in FIG. 3, the transmission induction coil 210 and the transmission resonance coil 220 may be constructed by using inductors L1 and L2 and capacitors C1 and C2 having predetermined inductances and capacitances, respectively.

Figure 4:
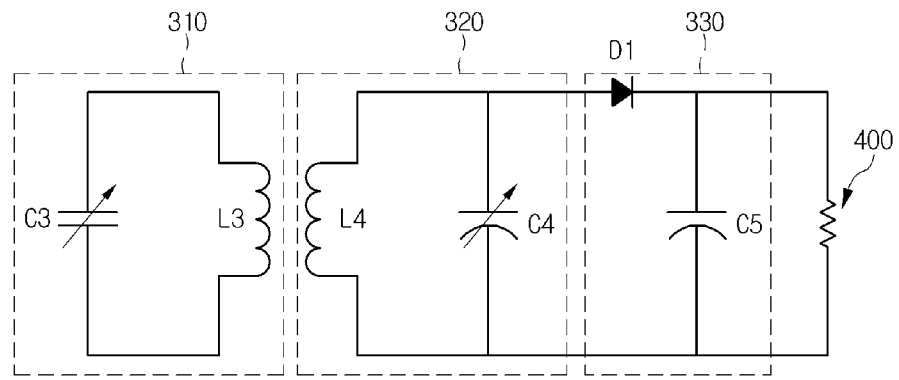
FIG. 4 is a circuit diagram showing an equivalent circuit of a wireless power receiving apparatus according to one embodiment of the disclosure.

FIG. 4 is a circuit diagram showing an equivalent circuit of the wireless power receiving apparatus 300 according to one embodiment of the disclosure.

As shown in FIG. 4, the receiving resonance coil 310 and the receiving induction coil 320 may be constructed by using inductors L3 and L4, and capacitors C3 and C4 having inductances and capacitances, respectively.

The rectification part 330 may be constructed by using a diode D1 and a rectification capacitor C5 to convert AC power into DC power to be output.

The rectification part 330 may include a rectifier and a smoothing circuit. The rectifier may include a silicon rectifier as a rectification element.

The smoothing circuit smoothes the output of the rectifier.

The load 400 may include a predetermined rechargeable battery or a device requiring the DC power. For example, the load 400 may refer to a battery.

The wireless power receiving apparatus 300 may be mounted on an electronic device, such as a cellular phone, a laptop computer, or a mouse, requiring the power.

Meanwhile, the above wireless power transmission technology may have various application ranges. For example, the wireless power transmission apparatus 200 may be provided on the internal wall or the internal ceiling of a building, and the wireless power receiving apparatus 300 may be installed in a terminal such as a cellular phone or a laptop computer. In this case, the user can charge a terminal of the user only if the user has the terminal in an interior equipped with the wireless power transmission apparatus 200.

Recently, many terminals employ touch screens equipped with touch panel as input units of a user. If the above receiving part is installed in the terminal having the touch screen, the frequency of a signal used for wireless power transmission interferes with the frequency of a signal used to touch detection of the touch panel, thereby causing the erroneous operation of the touch panel.

Hereinafter, the details thereof will be described.

Figure 5:
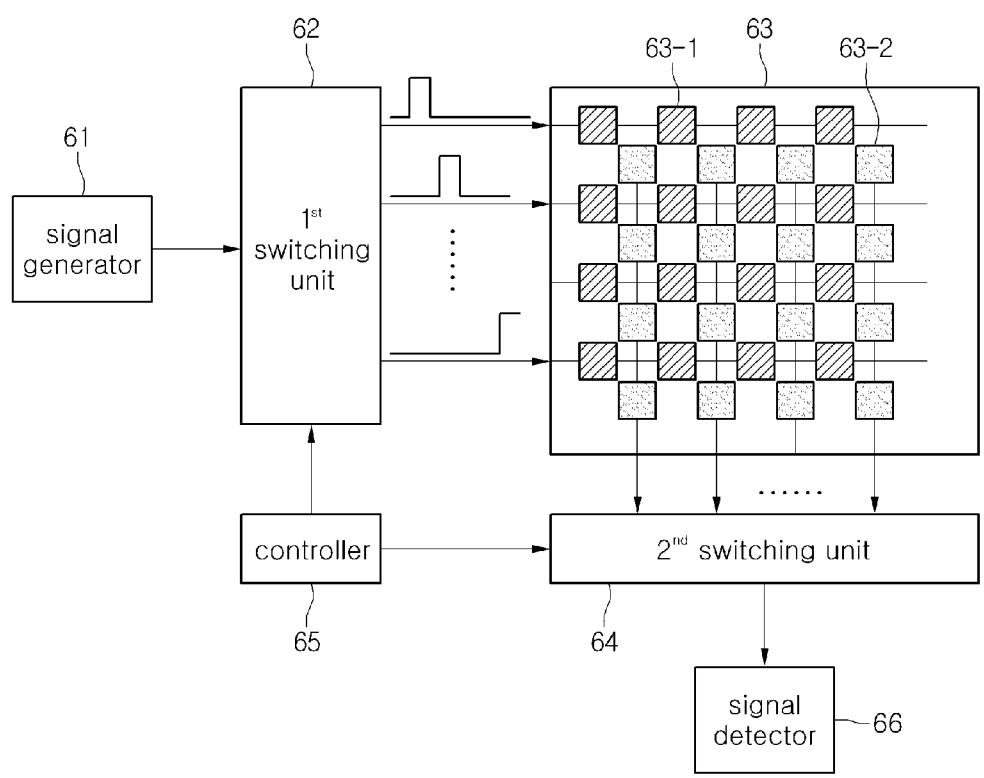
FIG. 5 is a view showing the structure of a touch panel according to the related art.

FIG. 5 is a view showing the structure of a touch panel 60 according to the related art. As shown in FIG. 5, an electrode array 63 having a transparent electrode including ITO is installed in the touch panel 60.

The electrode array 63 may be constructed through various schemes. FIG. 5 illustrates a dual electrode array including a first electrode array 63-1 and a second electrode array 63-2 arranged in a longitudinal direction and a traverse direction, respectively.

The first electrode array 63-1 includes a plurality of electrode plates connected to each other in a traverse direction, and the second electrode array 63-2 includes a plurality of electrode plates connected to each other in a longitudinal direction.

The first electrode array 63-1 is capacitive-coupled with the second electrode array 63-2.

A signal generator 61 generates a detection signal having a predetermined frequency to supply the detection signal to a first switching unit 62. The first switching unit 62 supplies the detection signal having a pulse waveform to the first electrode array 63-1 at a predetermined interval. If the pulse wave is input to the first electrode array 63-1 through the first switching unit 62, a pulse wave is output to the second electrode array 63-2 at a predetermined interval.

If an object such as a finger of a person approaches a top surface of the electrode array 63, the capacitive-coupling between the first and second electrode arrays 63-1 and 63-2 is enhanced, so that the intensity of the pulse-wave signal is increased. If the controller 65 finds the output time point of the pulse wave and a row number of the second electrode array 63-2 in which the intensity of the pulse wave is increased, the controller 65 may detect the access position of the object on the electrode array 63. Therefore, a command corresponding to the access position of the object can be performed.

However, if the above touch panel 60 is mounted on a terminal equipped with a receiver of a wireless power transmission system, an electric field and a magnetic field may induce a voltage to the electrode array 63 of the touch panel 60, and a signal detector 66 receives an abnormal signal to cause the erroneous operation.

According to the disclosure, all signals having frequency bands corresponding to signals used for wireless power transmission are removed by mounting a filter in a touch panel based on the fact that the frequency of a signal used for wireless power transmission is different from the frequency of signal used for the touch detection of the touch panel, so that the erroneous operation of the touch panel can be prevented.

Hereinafter, the touch panel according to one embodiment of the disclosure will be described with reference to FIGS. 6 to 8.

Figure 6:
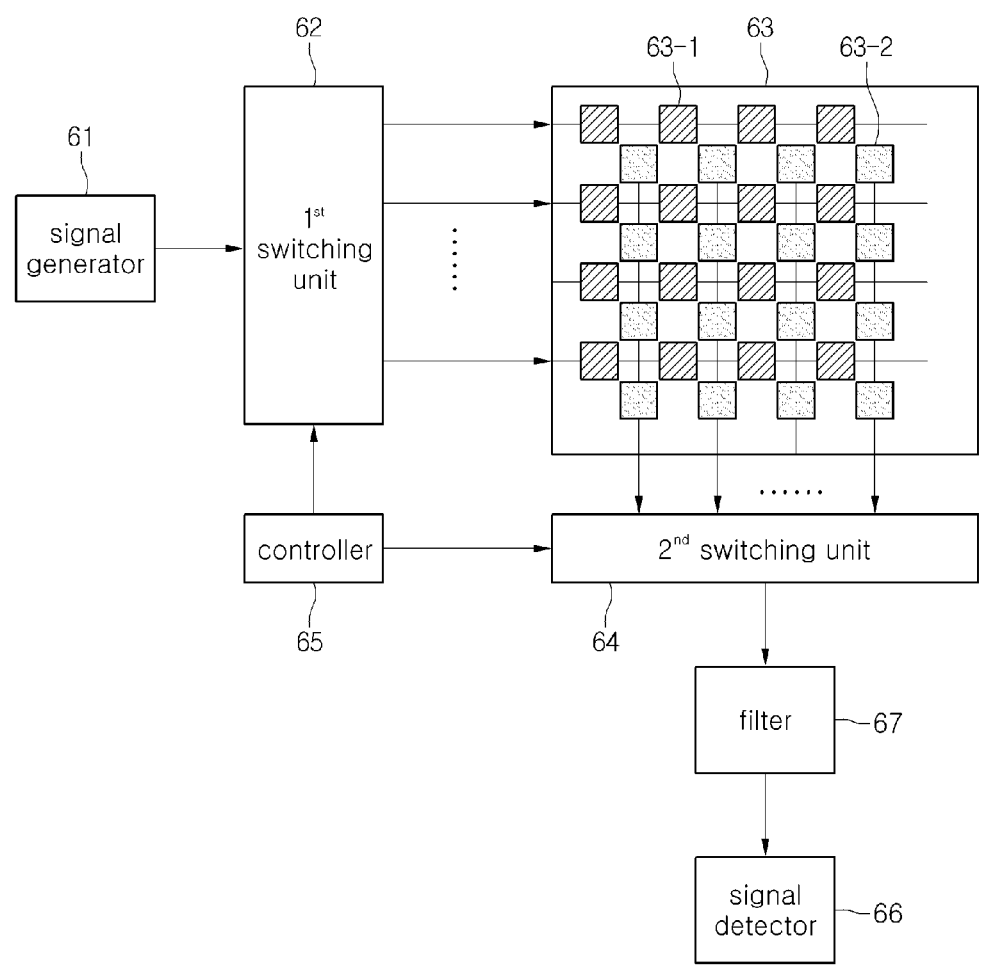
FIG. 6 is a view showing the structure of the touch panel according to one embodiment of the disclosure.

FIG. 6 is a view showing the structure of the touch panel according to one embodiment of the disclosure.

A signal used for wireless power frequency may have a first frequency f1, and a signal used for the touch detection in the touch panel may have a second frequency f2. Preferably, the first frequency is spaced apart from the second frequency by a predetermined distance.

As shown in FIG. 6, the signal generator 61 generates a detection signal having the second frequency, and the generated detection signal is input into the electrode array through the first switching unit 62. Similarly to the related art, if an object approaches, the intensity of a pulse-wave signal output from the second electrode array 63-2 is increased. The signal output from the second electrode array 63-2 is transferred to the signal detector 66. An input terminal of the signal detector 66 has a filter 67 to remove a signal having a frequency f1 corresponding to a signal used for the wireless power transmission.

The filter 67 cuts off the first frequency f1 of a signal used for wireless power transmission and passes the second frequency f2 of the detection signal used for the touch detection. The filter 67 may include a band pass filter, a band reject filter, a high pass filter, or a low pass filter, and may include a desirable filter according to the intensities of the first and second frequencies f1 and f2 and the interval between the first and second frequencies f1 and f2.

According to one embodiment, the filter 67 may have a structure in which at least one inductor is connected to at least one capacitor. Referring to FIG. 8, the filter 67 may have a structure in which one inductor is connected to one capacitor. If the signal having the frequency used for the wireless power transmission and the signal having the frequency used for the touch are input to the input terminal of the filter 67, the signal having the frequency used for the wireless power transmission may be filtered through the inductor and the capacitor. Therefore, only the signal having the frequency used for the touch is output from an output terminal of the filter 67.

Meanwhile, although the above embodiment has been described in that a dual electrode array is used as the electrode array 63, the disclosure is not limited thereto. In other words, a touch panel having an electrode array in a predetermined shape may be applied. In addition, according to the above embodiment, the switching units 62 and 64 may be omitted according to the touch panel, which is within the scope of the disclosure.

Figure 7:
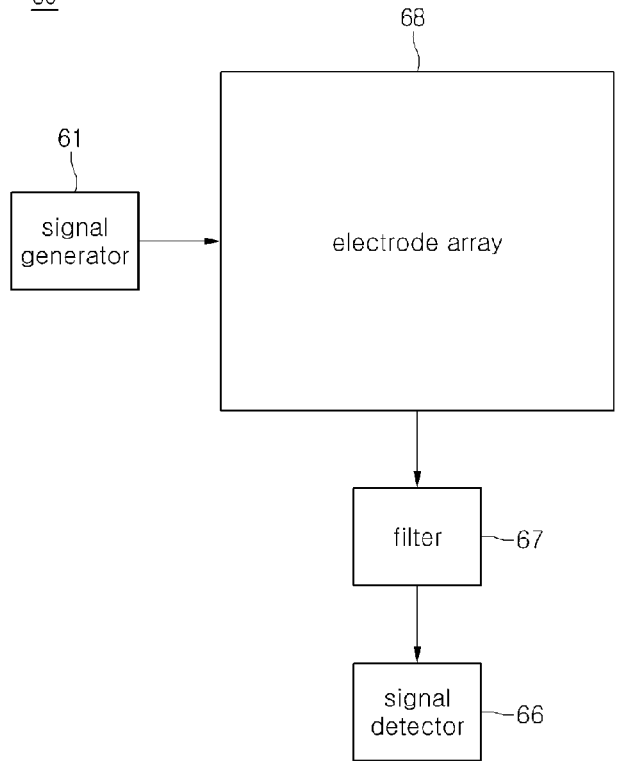
FIG. 7 is a block diagram showing a touch panel according to one embodiment of the disclosure.
Figure 8:
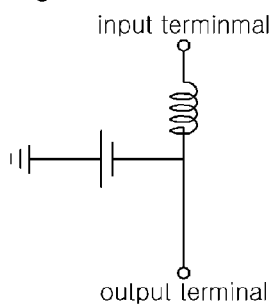
FIG. 8 is a circuit diagram showing a filter that is one component of the disclosure.

The feature of the disclosure may be generalized as a block diagram of FIG. 7.

As shown in FIG. 7, the touch panel 60 of the disclosure includes a signal generator 61 to generate the detection signal, the electrode array 68 to output a signal in response to the approach of the object, the filter 67 to remove the frequency of a signal used for the wireless power transmission, the signal detector 66 to detect a signal output from the electrode array 68, and a controller (not shown) to perform various operations according to the output of the signal detector 66.

The electrode array 68 according to the disclosure may include a resistivity electrode array and an electrostatic electrode array.

Figure 9:
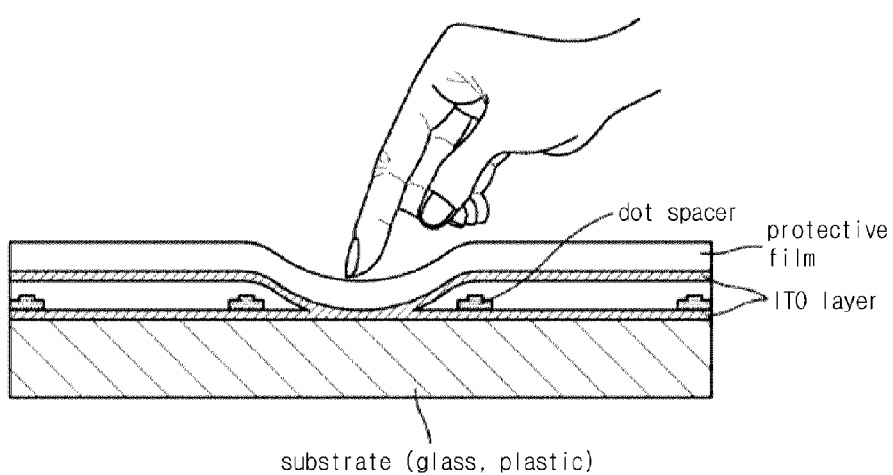
FIG. 9 is a view showing the structure of a resistive touch screen panel.

FIG. 9 shows a structure of a resistive touch screen panel

As shown in FIG. 9, a resistive touch screen panel has a structure in which an indium tin oxide (ITO) insulating layer is provided on a substrate, a dot spacer is provided on the ITO insulating layer for touch detection, an ITO insulating layer is provided on the dot spacer, and a film is coated on the resultant structure.

FIGS. 10(*a*) and 10(*b*) are plan views showing an upper plate and a lower plate constituting the resistive touch screen panel.

As shown in FIG. 10(*a*), the upper plate includes a resistive film 65, and first and second electrodes 61 and 62 are provided at both terminals of the resistive film 65 to apply voltage. Similarly, as shown in FIG. 10(*b*), the lower plate includes a resistive film 66, and first and second electrodes 73 and 74 are provided at both terminals of the resistive film 76 to apply voltage. The upper and lower plates are arranged perpendicularly to each other.

The resistive films 65 and 66 may include a transparent electrode, and may include one of ITO, IZO, ZnO, and AZO. The electrodes 61, 62, 63, and 64 may include conductive metal. Preferably, the electrodes 61, 62, 63, and 64 may include silver (Ag).

The resistive films 65 and 66 of FIGS. 10(*a*) and 10(*b*) are spaced apart from each other by dot spacers. If the resistive film 65 of FIG. 10(*a*) is touched, the resistive film 65 electrically makes contact with the resistive film 66 of FIG. 10(*b*).

The resistive film 75 may be used to measure coordinates in an x-directional, and the resistive film 76 may be used to measure coordinates in a y-direction.

In order to measure the x-direction coordinates, voltage V1 is applied to one electrode 61 of the resistive film 65 of FIG. 10(*a*), and the other electrode 62 of the resistive film 65 is grounded. If a touch is not made, since the resistive films 65 and 66 represent uniform resistance throughout the whole resistive films, a voltage value according to the distance from the electrode 61 represents a linear function relationship as shown in FIG. 11, and voltage Vx measured at a predetermined point x is calculated in following equation 1.

$$Vx = x*V1/a \qquad \text{Equation 1}$$

In equation 1, a refers to the width of the resistive film 65.

If the touch is not made, the value is represented. However, if the touch is made, as shown in FIG. 8, in the ITO insulating layer, an upper coating layer for detection of X-axis coordinates is electrically connected to a lower coating layer for the detection of Y-axis coordinates at the moment at which the touch is made. If the upper coating layer for detection of X-axis coordinates is electrically connected to the lower coating layer for the detection of Y-axis coordinates, a resistor R3 is electrically connected between resistors R1 and R2 at a touch point, so that a resistance value is changed. Accordingly, the measured voltage value is changed. Accordingly, touch data generated based on the measured voltage is compared with a threshold value, thereby determining if touch occurs at a corresponding point. In other words, touch sensitivity is determined by the threshold value.

The voltage value used to measure the x-direction coordinates may be measured by measuring the voltage of the electrode of the resistive film 66. If the touch is made, since a touched point 67 of the resistive layer 65 makes contact with the point 68 of the resistive layer 66, the voltage of the point 67 is the same as the voltage of the point 68. Since current does not flow through the resistive film 66 without voltage applied thereto, the voltage of the point 68 is the same as the voltage of the electrodes 63 and 64. Accordingly, the voltage at the touch point may be measured at the electrodes 63 and 64 of the resistive film 66 instead of the resistive film 65. If the voltage of the point 68 is found, the x-coordinate value of the point 68 can be found.

The y-direction coordinates of the touch point may be measured by changing the resistive film 65 in the measurement of the x-directional coordinates to the resistive film 66.

In order to measure the y-direction coordinates, the voltage V1 is applied to one electrode 63 of the resistive film 64, and the other electrode 64 of the resistive film 64 is grounded. If a touch is not made, since the resistive films 65 and 66 represent uniform resistance throughout the whole resistive films, a voltage value according to the distance from the electrode 63 represents a linear function relationship as shown in FIG. 11, and voltage Vy measured at a predetermined point y is calculated in following equation 2.

$$Vy = y*V1/b \qquad \text{Equation 2}$$

In equation 2, b refers to the width of the resistive film 66. If the touch is not made, the above value is represented. However, if the touch is made, the measured voltage value is changed, and the touch point can be detected based on the measured voltage value. In this case, similarly, the voltage value may be measured at the electrodes 63 and 64 of the resistive film 66 instead of the resistive film 66.

If an electronic device having the above resistive touch screen panel mounted thereon is charged through the wireless power transmission, error is caused in the voltage value detected by inducing voltage into the resistive films 65 and 66, so that the touch panel may be erroneously operated.

According to one embodiment of the disclosure, the voltage induced into the resistive film due to wireless power transmission can be removed by connecting an LC circuit, which is shorted, that is, represents a zero impedance value at a frequency of a signal used for the wireless power transmission, to the electrodes 71, 72, 73, and 74 of the resistive films 75 and 76.

In more detail, a wireless power transmission system employing magnetic resonance transmits power having a predetermined frequency f1. In this case, the voltage having the frequency f1 is induced into the resistive film of the touch panel.

In this case, as shown in FIGS. 13(a) and 13(b), the voltage induced in to the resistive film can be removed by connecting LC resonance circuits 71, 72, 73, and 74 representing the zero impedance value at the frequency f1 to the related resistive films 65 and 66.

On the assumption that the signal used for the wireless power transmission has the frequency f1, the LC value of an LC circuit having a series-structure can be found through following equations.

$$Z = j\omega L + 1/j\omega C = 0 \qquad \text{Equation 3}$$

The LC circuit must satisfy a following condition derived from equation 3.

$$LC = 1/4\pi f12 \qquad \text{Equation 4}$$

The wireless power receiving apparatus according to the embodiment of the disclosure may be mounted on various electronic devices, which wirelessly perform power transmission, for the utilization thereof as well as a touch panel or a touch screen.

For example, in the case of an electronic device employing both of wireless power transmission and short range communication modules, when a signal having a frequency used for the wireless power transmission is removed from signals having frequencies used for the short range communication module, the short range communication can be prevented from being interrupted by using the wireless power receiving apparatus according to the embodiment of the disclosure.

The short range communication module may include a near field communication (NFC), or a Blue tooth, but the embodiment is not limited thereto.

For example, the wireless power receiving apparatus according to the embodiment of the disclosure may be applied to a camera having an image sensor based on wireless power transmission.

In other words, in the case of the image sensor to detect the information of an object to be converted into an electrical image signal, when a signal having a frequency used for wireless power transmission is removed from image signals having the information of the object, the image sensor can be prevented from being erroneously operated by using the wireless power transmission apparatus.

The disclosure can be utilized even in an electric vehicle system.

In other words, an electronic control unit (ECU) serving as a controller to control the driving of the engine, the automatic transmission, or a brake of an electric vehicle may employ the wireless power receiving apparatus according to the embodiment of the disclosure in order to prevent the erroneous operation of each device.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An electronic device equipped with a wireless power receiving apparatus to wirelessly receive power from a wireless power transmission apparatus, the electronic device comprising:
 a signal receiving part to receive an operating signal required to operate the electronic device; and
 a wireless power signal removing part to remove a power signal having a resonant frequency used for wireless power transmission from the operating signal;
 wherein the wireless power signal removing part includes a filter and a signal detector,
 wherein the filter removes the power signal having the resonant frequency used for the wireless power transmission and transmits an output signal to the signal detector, and wherein the signal detector detects the operation signal based on the output signal in which the power signal having the resonant frequency used for the wireless power transmission is removed.

2. The electronic device of claim 1, wherein the operating signal comprises a touch signal detected by an input unit, and
wherein the filter removes the power signal having the resonant frequency used for the wireless power transmission from the touch signal.

3. An electronic device equipped with a wireless power receiving apparatus to wirelessly receive power from a wireless power transmission apparatus, the electronic device comprising:
a signal receiving part to receive an operating signal required to operate the electronic device; and
a wireless power signal removing part to remove a power signal having a resonant frequency used for wireless power transmission from the operating signal;
wherein the signal receiving part comprises:
a signal generator to generate a detection signal used for detecting approach of an object; and
an electrode array to receive the detection signal and modulate the detection signal according to the approach of the object; and
wherein the wireless power signal removing part comprises:
a filter to remove the power signal having the resonant frequency used for the wireless power transmission from the modulated detection signal;
a signal detector to detect the operating signal from the filter; and
a controller to perform an operation corresponding to the operating signal detected by the signal detector.

4. The electronic device of claim 3, wherein the electrode array comprises:
a first electrode array arranged in a first direction to receive the detection signal and a second electrode array arranged in a second direction to output the modified detection signal, and
wherein the signal receiving part further comprises:
a first switching part to sequentially apply the detection signal generated from the signal generator to the first electrode array.

5. The electronic device of claim 4, wherein the signal receiving part further comprises:
a second switching part to receive the detection signal output from the second electrode array and to transfer the detection signal to the filter.

6. The electronic device of claim 3, wherein the signal receiving part comprises a resistive film having two terminals equipped with electrodes, and
the filter comprises an LC circuit connected to the electrodes and shorted at the resonant frequency used for the wireless power transmission to remove a voltage induced into the resistive film.

7. The electronic device of claim 6, wherein the resistive film comprises:
a first resistive film having two terminals equipped with first electrodes; and
a second resistive film having two terminals equipped with second electrodes perpendicular to the first electrodes.

8. The electronic device of claim 7, wherein the LC circuit comprises:
first LC circuits connected to the first electrodes; and
second LC circuits connected to the second electrode.

9. The electronic device of claim 7, wherein at least one of the first and second resistive films includes a transparent electrode including at least one of ITO, IZO, ZnO and AZO, and a protective film to protect the resistive film, and
wherein the first and second resistive films are spaced apart from each other by a spacer.

10. The electronic device of claim 1, wherein the wireless power receiving apparatus receives power from the wireless power transmission apparatus by using electromagnetic induction.

11. The electronic device of claim 1, wherein the wireless power receiving apparatus comprises:
a first coil resonance-coupled with the wireless power transmission apparatus to receive power; and
a second coil inductive-coupled with the first coil to receive power.

12. A wireless power receiving apparatus to wirelessly receive power from a wireless power transmission apparatus, the wireless power receiving apparatus comprising:
a receiving coil part to wirelessly receive power from the wireless power transmission apparatus; and
a signal detection part to operate by the received power and to detect a second signal obtained by removing a first signal having a first frequency,
wherein the first frequency is a resonant frequency of the power from the wireless power transmission apparatus;
wherein the signal detection part includes a filter and a signal detector,
wherein the filter removes the first signal having the resonant frequency of the power from the wireless power transmission apparatus and transmits the second signal to the signal detector, and
wherein the signal detector detects the second signal in which the first signal having the resonant frequency is moved.

13. The wireless power receiving apparatus of claim 12, wherein the first frequency is a frequency used for wireless power transmission.

14. The wireless power receiving apparatus of claim 12, wherein the filter passes the second signal having a second frequency and removes the first signal having the first frequency, and
the filter comprises at least one of a band pass filter, a band reject filter, a low pass filter, and a high pass filter.

15. The wireless power receiving apparatus of claim 12, wherein the receiving coil part receives power from the wireless power transmission apparatus by using electromagnetic induction.

16. The wireless power receiving apparatus of claim 12, wherein the receiving coil part comprises:
a receiving resonance coil resonance-coupled with a transmission resonance coil of the wireless power transmission apparatus to receive power; and
a receiving induction coil inductive-coupled with the receiving resonance coil to receive the power.

17. A display device comprising:
a display panel to display an image; and
a touch panel disposed on a front surface of the display panel and allowing selection of at least one function displayed on the display panel through a touch manipulation operation,
wherein the touch panel comprises:
a touch receiving part to receive a touch signal through an input unit;
a filter to remove a power signal having a resonant frequency used for wireless power transmission from the touch signal and to produce an output signal; and
a signal detector receiving the output signal, wherein the power signal having the resonant frequency used for the wireless power transmission is removed in the output signal.

18. The electronic device of claim 6, wherein the LC circuit comprises at least an inductor and at least a capacitor, the inductor and the capacitor connected in series.

19. The electronic device of claim 6, wherein at least a portion of the LC circuit has a ground state.

20. The electronic device of claim 6, wherein the LC circuit has a zero impedance value at the resonant frequency used for the wireless power transmission.

* * * * *